3,049,562
1-(ARALKYL, LOWER ALKYLAMINO LOWER ALKYL), 1-PHENYL, 3,3-DILOWER ALKYL-UREAS
William B. Wright, Jr., Woodcliff Lake, N.J., and Herbert J. Brabander, Pearl River, N.Y., assignors to American Cyanamid Company, New York, N.Y., a corporation of Maine
No Drawing. Filed Mar. 9, 1961, Ser. No. 94,432
7 Claims. (Cl. 260—553)

This invention relates to new organic compounds. More particularly, it relates to substituted ureas and methods of preparing the same.

In the past, substituted ureas have been described as having local anesthetic activity. In the J. Am. Chem. Soc. 60, 158 (1938), Wenker described, for example, 1-(2-piperidinopropyl)-3-phenylurea and alkoxyphenyl derivatives thereof. These compounds are considerably different both chemically and biologically from those of the present invention.

We have now found that compounds having the following structure are, in general, active as diuretics.

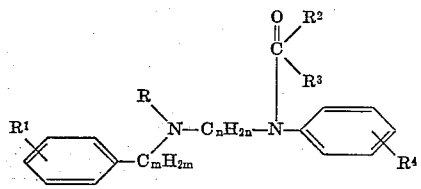

in which R is a lower alkyl radical, $R^2$ and $R^3$ are lower alkyl and when taken together with the nitrogen atom are members of the group consisting of pyrrolidino, morpholino, piperidino and hexamethylenimino radicals, $R^1$ and $R^4$ are members of the group consisting of hydrogen, halogen, lower alkoxy and lower alkyl radicals, $m$ is an integer from 1 to 3, $n$ is an integer from 2 to 3 and acid addition salts thereof.

The compounds of the present invention are basic, forming acid addition salts, which are, in general, crystalline solids, as shown in the examples hereinafter. The compounds themselves are, in general, liquids at room temperature, relatively insoluble in water but soluble in most organic solvents. As indicated above, they form salts with mineral acids which are generally soluble in water and alcohol but relatively insoluble in solvents such as ether, benzene, toluene and the like.

Starting materials useful in preparing the compounds of the present invention are alkylenediamines. These alkylenediamines can be prepared by alkylation of an aniline derivative with an aminoalkyl halide in forming those compounds having an unbranched alkyl chain. This reaction is carried out usually with one and one-half mols of the aniline compound, one mol of dialkylaminoalkyl chloride hydrochloride and 2 mols of sodium carbonate refluxing in toluene for sixteen hours or more. When a branched chain alkylenediamine is desired, a 2-aminopropionamide is reduced in tetrahydrofuran with lithium aluminum hydride by procedures well known in the art.

The present compounds are best prepared by reaction of substituted ethylenediamines with appropriate carbonyl-chlorides

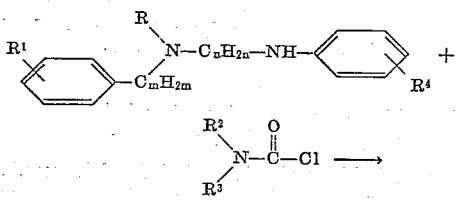

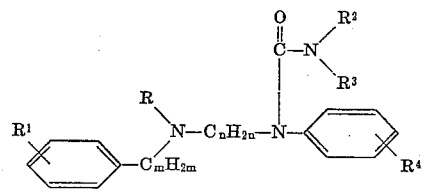

in which R, $R^1$, $R^2$, $R^3$, $R^4$ and $m$ and $n$ are as defined above. The reaction can be carried out, for example, by contacting the reactants in an inert solvent such as benzene or toluene at room temperature or by heating on a steam bath for 1 to 24 hours. An acid acceptor such as sodium carbonate, potassium carbonate, pyridine, piperidine, triethylamine or the like may be used if desired.

A second method for the preparation of these compounds is to react an aralkyl halide with an N-(alkylaminoalkyl)-urea derivative as illustrated below:

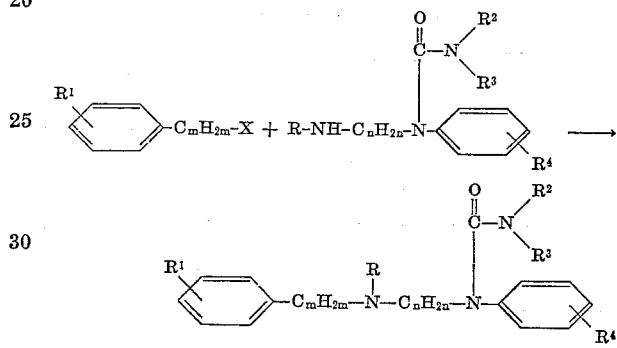

in which R, $R^1$, $R^2$, $R^3$, $R^4$ and $m$ and $n$ are as hereinbefore defined. This reaction is best carried out at reflux temperature in an inert solvent such as ethanol, benzene and the like.

The N-(alkylaminoalkyl)-urea derivatives used as starting materials in the above reaction are easily prepared by debenzylation of a suitable N-(benzylalkylaminoalkyl)-urea derivative.

Following completion of the reaction, the product can be isolated as either the base or the salt thereof.

The compounds of the present invention are active as diuretics when tested in animals such as rats and dogs by the procedures of (a) J. R. Cummings, J. D. Haynes, L. M. Lipchuk and M. A. Rosenberg, Journal of Pharmacology and Experimental Therapeutics 128, 414 (1960), and (b) M. M. Little and C. Cooper, Jr., Federation Proceedings 9, 296 (1950). They, therefore, are useful in the treatment of edema or other physiological conditions involving water in the tissues.

The following examples illustrate the preparation of substituted ureas of the present invention in greater detail. Parts are by weight unless otherwise indicated.

EXAMPLE I

Preparation of 1-(2-Benzylmethylaminoethyl)-3,3-Dimethyl-1-Phenylurea

A mixture of 24 parts of N-benzyl-N-methyl-N'-phenyl-ethylenediamine, 20 parts of triethylamine, 21.5 parts of dimethylcarbamyl chloride and 100 parts of benzene is heated at reflux temperature for 3–5 hours, cooled and filtered to remove the insoluble triethylamine hydrochloride. The benzene solution is stirred for one hour with 150 parts of 2 N hydrochloric acid and the layers are separated. The aqueous layer is contacted with 80 parts of 5 N sodium hydroxide and the organic base is extracted into ether. The ether layer is dried over magnesium sulfate and distilled. 1-(2-benzylmethylaminoethyl)-3,3- dimethyl-1-phenylurea is collected at 175–180° C. (0.1 mm.).

The above oil treated with ethanolic hydrochloric acid and ether gives the hydrochloride, melting point 150–152° C.

EXAMPLE II

*Preparation of 1-(2-Benzylmethylaminopropyl)-3,3-Dimethyl-1-Phenylurea*

A mixture of 10.2 parts of $N^2$-benzyl-$N^2$-methyl-$N^1$-phenyl-1,2-propanediamine, 8 parts of triethylamine, 8.7 parts of dimethylcarbamyl chloride and 60 parts of benzene is heated at reflux for 4 hours and then filtered to remove the precipitated triethylamine hydrochloride. The mother liquid is shaken with 2 N hydrochloric acid and the layers are separated. The acidic layer is made alkaline with 5 N sodium hydroxide and the oily product is extrated into ether. The ether layer is dried over magnesium sulfate and distilled. 1-(2-benzylmethylaminopropyl)-3,3-dimethyl-1-phenylurea is collected at 170–174° C. (0.2 mm.).

EXAMPLE III

*Preparation of 1-(3-Benzylmethylaminopropyl)-3,3-Dimethyl-1-Phenylurea*

When N-benzyl-N-methyl-N'-phenyl-1,3-propanediamine is substituted for N-benzyl-N-methyl-N'-phenylethylenediamine in the procedure of Example I, 1-(3-benzylmethylaminopropyl)-3,3-dimethyl-1-phenylurea, boiling point 173–177° C. (0.2 mm.), is obtained.

EXAMPLE IV

*Preparation of 1,1-Dimethyl-3-(2-Methylphenethylaminopropyl)-3-Phenylurea*

When $N^2$-methyl-$N^2$-phenethyl-$N^1$-phenyl-1,2-propanediamine is substituted for N-benzyl-N-methyl-N'-phenylethylenediamine in the procedure of Example I, 1,1-dimethyl-3-(2-methylphenethylaminopropyl)-3-phenylurea, boiling point 170–175° C. (0.2 mm.), is obtained.

EXAMPLE V

*Preparation of 1-(2-Benzylmethylaminoethyl)-1-(m-Tolyl)-3,3-Dimethylurea*

The above compound, boiling point 178–184° C. (0.3 mm.), is prepared by the method of Example I, except that N-benzyl-N-methyl-N'-m-tolylethylenediamine is substituted for N-benzyl-N-methyl-N'-phenylethylenediamine.

EXAMPLE VI

*Preparation of 1-(2-Benzylmethylaminoethyl)-3,3-Dimethyl-1-(p-Methoxyphenyl)urea*

The above compound, boiling point 182–186° C. (0.3 mm.), is prepared by the method of Example I except that N-benzyl-N-methyl-N'-p-methoxyphenylethylenediamine is substituted for N-benzyl-N-methyl-N'-phenylethylenediamine.

EXAMPLE VII

*Preparation of 1-(2-Benzylmethylamino-1-Methylethyl)-3,3-Dimethyl-1-Phenylurea*

The above compound, boiling point 152–156° C. (0.1 mm.), is prepared by the method of Example I, except that $N^1$-benzyl-$N^1$-methyl-$N^2$-phenyl-1,2-propanediamine is substituted for N-benzyl-N-methyl-$N^1$-phenylethylenediamine. The hydrochloride salt melts at 127–129° C.

EXAMPLE VIII

*Preparation of 1-(2-Benzylmethylaminoethyl)-1-(p-Chlorophenyl)-3,3-Dimethylurea*

Substituting N-benzyl-N'-(p-chlorophenyl)-N-methylethylenediamine for N-benzyl-N-methyl-N'-phenylethylenediamine in Example I, the above product is obtained.

EXAMPLE IX

*Preparation of 1-(2-Benzylmethylaminopropyl)-1-(p-Bromophenyl)-3,3-Dimethylurea*

This compound is prepared by the method of Example I, except that $N^2$-benzyl-$N^1$-(p-bromophenyl)-$N^2$-methyl-1,2-propanediamine is substituted for N-benzyl-N-methyl-N'-phenylethylenediamine.

EXAMPLE X

*Preparation of 1-(2-Benzylmethylaminopropyl)-3,3-Diethyl-1-Phenylurea*

This compound, boiling point 155–165° C. (0.08 mm.), is prepared by the method of Example II, except that diethylcarbamyl chloride is substituted for dimethylcarbamyl chloride.

EXAMPLE XI

*Preparation of 1-(N-Benzylmethylaminoethyl-N-Phenylcarbamyl)-Piperidine*

This compound is prepared by the method of Example I, except that 1-piperidinocarbonyl chloride is substituted for the dimethylcarbamyl chloride.

EXAMPLE XII

*Preparation of 1-(N-Benzylmethylaminoethyl-N-Phenylcarbamyl)-Pyrrolidine*

In an experiment using the process of Example I and substituting 1-pyrrolidinocarbonyl chloride for dimethylcarbamyl chloride, the above product is obtained.

EXAMPLE XIII

*Preparation of 1-(N-Benzylmethylaminoethyl-N-Phenylcarbamyl)-Hexamethyleneimine*

This compound is prepared by the method of Example I, except that 1-hexamethyleneiminocarbonyl chloride is substituted for dimethylcarbamyl chloride.

EXAMPLE XIV

*Preparation of 1-(N-Benzylmethylaminoethyl-N-Phenylcarbamyl)-Morpholine*

This compound is prepared by the method of Example I, except that 1-morpholinocarbonyl chloride is substituted for dimethylcarbamyl chloride.

EXAMPLE XV

*Preparation of 1-[2-(p-Chlorobenzylmethylamino)-Propyl]-3,3-Dimethyl-1-Phenylurea*

A mixture of 19.5 parts of 1-(2-benzylmethylaminopropyl)-3,3-dimethyl-1-phenylurea, 12 parts by volume of 5 N hydrochloric acid, 10 parts of water, 80 parts of ethanol and 2 parts of 10% palladium-on-carbon catalyst is shaken in a Parr hydrogenator under a hydrogen pressure of about 3 atmospheres until one molar equivalent of hydrogen is absorbed. The catalyst is filtered off and the mother liquor is concentrated under reduced pressure to remove the organic solvent. The residue is contacted with 15 parts of 5 N sodium hydroxide solution and the mixture is extracted with ether. The ether extract is washed with salt solution, dried over magnesium sulfate and concentrated. The oily residue is dissolved in 50 parts of ethanol and mixed with 7.2 parts of p-chlorobenzylchloride. The reaction mixture is heated at reflux for 18 hours and concentrated to remove the solvent. The residue is made strongly alkaline with dilute sodium hydroxide and the organic base is extracted into ether. 1-[2-(p-chlorobenzylmethylamino)propyl]-3,3-dimethyl-1-phenylurea distills at 170–180° C. (0.05 mm.).

EXAMPLE XVI

*Preparation of 1-[2-(m-Chlorobenzylmethylamino)Propyl]-3,3-Dimethyl-1-Phenylurea*

This compound, boiling point 170–176° C. (0.05 mm.), is prepared by the method of Example XV, except that m-chlorobenzyl bromide is substituted for p-chlorobenzyl chloride.

EXAMPLE XVII

*Preparation of 1-[2-(p-Fluorobenzylmethylamino) Propyl]-3,3-Dimethyl-1-Phenylurea*

This compound, boiling point 155–160° C. (0.05 mm.) is prepared by the method of Example XV, except that p-fluorobenzyl chloride is substituted for p-chlorobenzyl chloride.

EXAMPLE XVIII

*Preparation of 1-[2-(m-Methylbenzylmethylamino) Propyl]-3,3-Dimethyl-1-Phenylurea*

This compound, boiling point 165–170° C. (0.05 mm.), is prepared by the method of Example XV, except that m-methylbenzyl chloride is substituted for p-chlorobenzyl chloride.

EXAMPLE XIX

*Preparation of 1-[2-(p-Bromobenzylmethylamino) Propyl]-3,3-Dimethyl-1-Phenylurea*

This compound is prepared by the method of Example XV, except that p-bromobenzyl chloride is substituted for p-chlorobenzyl chloride.

EXAMPLE XX

*Preparation of 1-[2-(p-Methoxybenzylmethylamino) Propyl]-3,3-Dimethyl-1-Phenylurea*

This compound is prepared by the method of Example XV, except that p-methoxybenzylbromide is substituted for p-chlorobenzyl chloride.

This application is a continuation-in-part of our copending application Serial No. 6,628, filed February 4, 1960, now abandoned.

We claim:
1. A member of the group consisting of compounds of the formula:

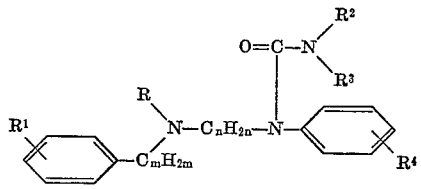

in which R is a lower alkyl radical, $R^2$ and $R^3$ are lower alkyl and when taken together with the nitrogen atom are members of the group consisting of pyrrolidino, morpholino, piperidino and hexamethylenimino radicals, $R^1$ and $R^4$ are members of the group consisting of hydrogen, halogen, lower alkoxy and lower alkyl radicals, $m$ is an integer from 1 to 3, $n$ is an integer from 2 to 3 and pharmaceutically acceptable acid addition salts thereof.

2. The compound 1-(2-benzylmethylaminoethyl)-3,3-dimethyl-1-phenylurea.

3. The compound 1-(2-benzylmethylaminopropyl)-3,3-dimethyl-1-phenylurea.

4. The compound 1-(3-benzylmethylaminopropyl)3,3-dimethyl-1-phenylurea.

5. The compound 1,1-dimethyl-3-(2-methylphenethylaminopropyl)-3-phenylurea.

6. The compound 1-(2-benzylmethylaminoethyl)-1-(m-tolyl)-3,3-dimethylurea.

7. The compound 1-(2-benzylmethylaminopropyl)-3,3-diethyl-1-phenylurea.

References Cited in the file of this patent
UNITED STATES PATENTS

| 2,220,508 | Back et al. | Nov. 5, 1940 |
| 2,409,829 | Boon | Oct. 22, 1946 |
| 2,639,285 | Sondern et al. | May 19, 1953 |
| 2,673,878 | Cusic | Mar. 30, 1954 |